United States Patent
Taylor

(10) Patent No.: US 7,684,140 B2
(45) Date of Patent: Mar. 23, 2010

(54) DETERMINING ANGULAR POSITION OF A TAPE REEL USING TIMING BASED SERVO FORMAT

(75) Inventor: Mark Allan Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/040,410

(22) Filed: Feb. 29, 2008

(65) Prior Publication Data

US 2009/0219643 A1    Sep. 3, 2009

(51) Int. Cl.
G11B 15/52    (2006.01)
G11B 15/46    (2006.01)
G11B 5/584    (2006.01)

(52) U.S. Cl. ............... 360/73.11; 360/73.04; 360/77.12
(58) Field of Classification Search .................. None
See application file for complete search history.

(56) References Cited

U.S. PATENT DOCUMENTS

| | | | |
|---|---|---|---|
| 4,977,466 A | 12/1990 | Nakata | |
| 5,689,384 A | 11/1997 | Albrecht et al. | |
| 5,815,336 A | 9/1998 | Yim | |
| 6,282,051 B1 * | 8/2001 | Albrecht et al. | ............... 360/75 |
| 6,754,026 B1 | 6/2004 | Koski | |
| 2002/0198678 A1 * | 12/2002 | Koski et al. | ............... 702/164 |
| 2004/0036428 A1 * | 2/2004 | Bui et al. | ............... 318/254 |
| 2004/0141250 A1 | 7/2004 | Harper et al. | |
| 2008/0278103 A1 * | 11/2008 | Takeishi et al. | ............. 318/430 |

OTHER PUBLICATIONS

US Application "Determining A Reel Motor Angle Using an Estimated Interval to Degrees Translation Factor", by inventor J.L. Dahle and M.A. Taylor, U.S. Appl. No. 12/040,419, filed Feb. 29, 2008.

* cited by examiner

*Primary Examiner*—Andrew L Sniezek
(74) *Attorney, Agent, or Firm*—Janaki K. Davda; Konrad Raynes & Victor LLP

(57) ABSTRACT

Provided are techniques for determining an angular position of a tape reel. A first edge of a hall sensor is identified. A number of format transitions on a timing based servo formatted tape are counted until detecting a predetermined edge of the hall sensor. A reel circumference is determined. A radius is determined using the determined reel circumference. A new circumference of a next revolution is determined using the determined radius and a tape thickness. A current angular position is determined using the determined new circumference and the counted format transitions.

24 Claims, 6 Drawing Sheets

US 7,684,140 B2

DETERMINING ANGULAR POSITION OF A TAPE REEL USING TIMING BASED SERVO FORMAT

CROSS-REFERENCE TO RELATED APPLICATION

This application is related to commonly owned and co-pending application Ser. No. 12/040,419, entitled "DETERMINING A REEL MOTOR ANGLE USING AN ESTIMATED INTERVAL TO DEGREES TRANSLATION FACTOR," by J. L. Dahle et al., filed on same date herewith, and which is incorporated by reference herein in its entirety.

BACKGROUND

1. Field

Embodiments of the invention relate to determining an angular position of a tape reel using a timing based servo format.

2. Description of the Related Art

A host computer may be coupled to a tape drive. The host computer includes cache and executes a host application. The tape drive has tape cartridges for storing data.

With track densities increasing and tape thickness decreasing in the tape storage industry, fluctuations in tension can cause, but is not limited to, the following problems:

1. Track misplacement caused by changes in tape width due to changes in tension (Poisson's Ratio).

2. Stack quality changes (e.g., conditions, such as spoking, are related to tension fluctuations. Spoking may occur when magnetic tape is wound onto a tape reel with the tension increasing toward the end of the winding, and the higher tension on the outside of the tape causes the inner coils of the tape to buckle and deform.

The two problems listed above significantly reduce the chance that the tape drive will be capable of retrieving the data from the tape at a later time.

In tape drive systems, reel motors control the tape motion and tape tension. Precision control of the reel to reel motors enables more accurate and consistent tape tension, which can improve the head to tape interface and minimize tape damage. Such precision control also allows the drive to operate at higher tape velocities without tape damage.

One of the sources of tension fluctuations may be found in the reel motors within the tape drive. This is due to the variation in the torque that a reel motor produces as the motor rotates. This torque ripple occurs as the magnets align with the field windings. A technique of motor control called Field Oriented Control, also called Vector Control, which is capable of maintaining a force whose direction is tangent to the rotor, may be used to reduce torque ripple and to enable more efficient control of brushless DC motors (BLDC motors). These control techniques are able to apply current to the motor in a way that gives a more controlled, smooth torque. However, one of the variables in these control techniques is the angular position of the motor (also referred to as a reel motor angle), which is used so that currents can be appropriately applied to the motor windings. In particular, different currents are applied to the motor windings such that these different currents cause a certain magnetic field, and these currents are adjusted as the motor turns. The angular position may be described as an amount of rotation from an origin (e.g., x degrees/360 degrees, which is a fraction ranging from zero to one) or angular position may be described in degrees ranging from zero to 360. Usually the angular position of the motor is provided by an encoder attached to the reel motor. However, encoders tend to be expensive components, and, in order to keep the cost of the tape drive down, there are no encoders on the reel motors in a tape drive.

Thus, there is a need in the art for improved determination of an angular position of a tape reel.

SUMMARY OF EMBODIMENTS OF THE INVENTION

Provided are a method, computer program product, and system for determining an angular position of a tape reel. A first edge of a hall sensor is identified. A number of format transitions on a timing based servo formatted tape are counted until detecting a predetermined edge of the hall sensor. A reel circumference is determined. A radius is determined using the determined reel circumference. A new circumference of a next revolution is determined using the determined radius and a tape thickness. A current angular position is determined using the determined new circumference and the counted format transitions.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
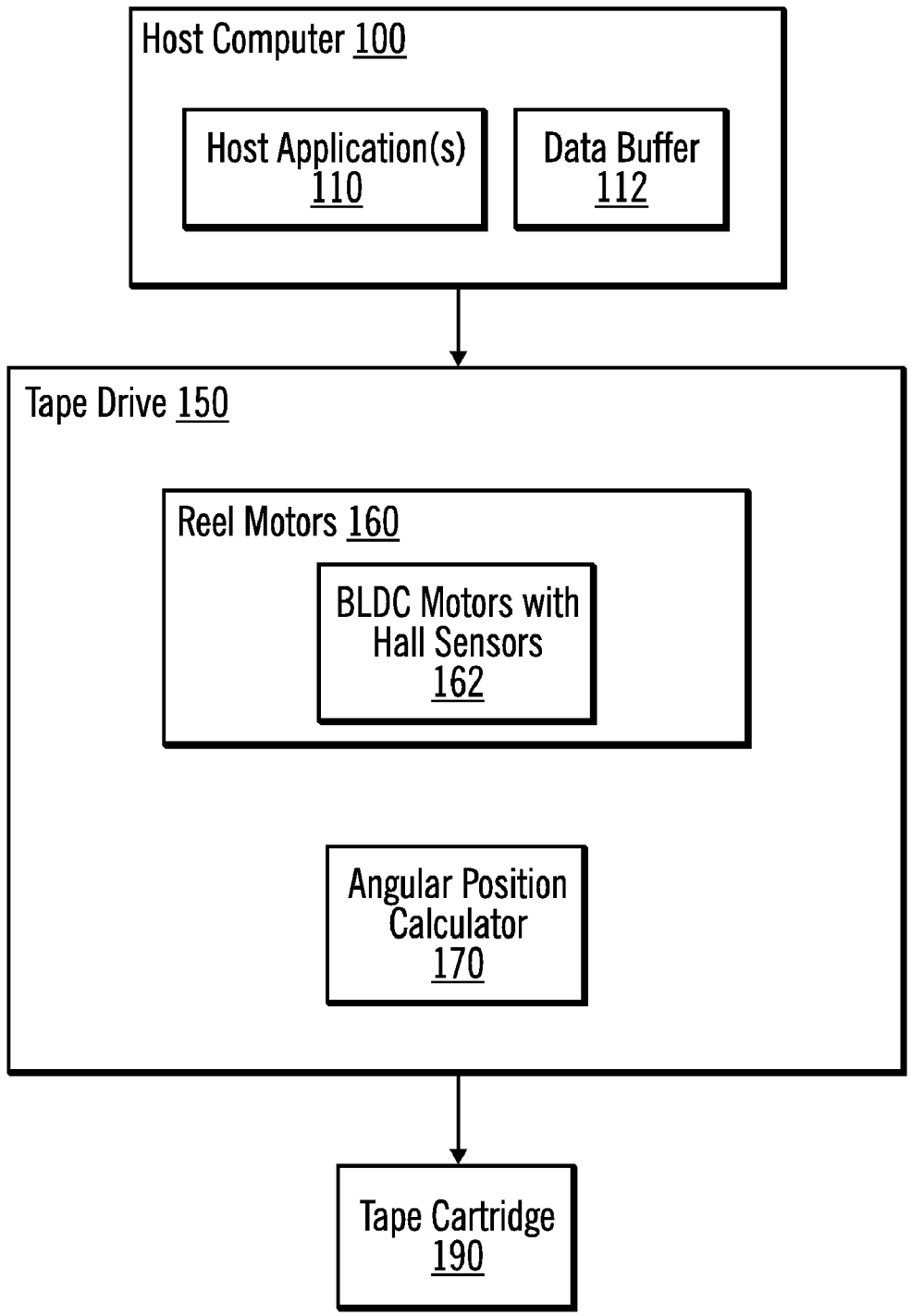
FIG. 1 illustrates, in a block diagram, a computing environment in accordance with certain embodiments.

FIG. 1 illustrates, in a block diagram, a computing environment in accordance with certain embodiments. A host computer 100 is coupled to a tape drive 150. Although the host computer 100 is shown as being directly coupled to the tape drive 150, in alternative embodiments, the host computer 100 may be coupled to a virtual tape server or storage controller that is coupled to the tape drive 150. The host computer 100 includes one or more host applications 110 and a data buffer 112.

The tape drive 150 includes BrushLess DC (BLDC) motors with hall sensors 162 for commutation for the reel motors 160. The tape drive also includes an angular position calculator 170.

Figure 2:
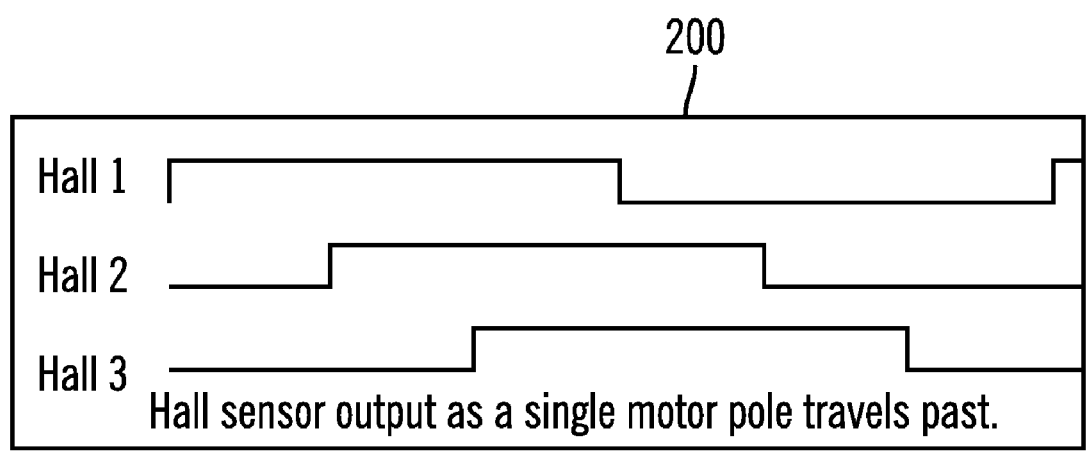
FIG. 2 illustrates a graph of hall sensor output in accordance with certain embodiments.

FIG. 2 illustrates a graph 200 of hall sensor output in accordance with certain embodiments. Hall sensors may also be referred to as hall effect sensors. The hall sensors change state as the poles of a motor pass by. This pattern repeats for each pole within the motor (e.g., if there are 8 poles in the motor, there are 8 rising edges on each of the hall sensors). Given that the number of poles within a motor is a design constraint and is known a full revolution of the motor can be determined by counting the rising (or falling) edges on a hall sensor.

Figure 3:
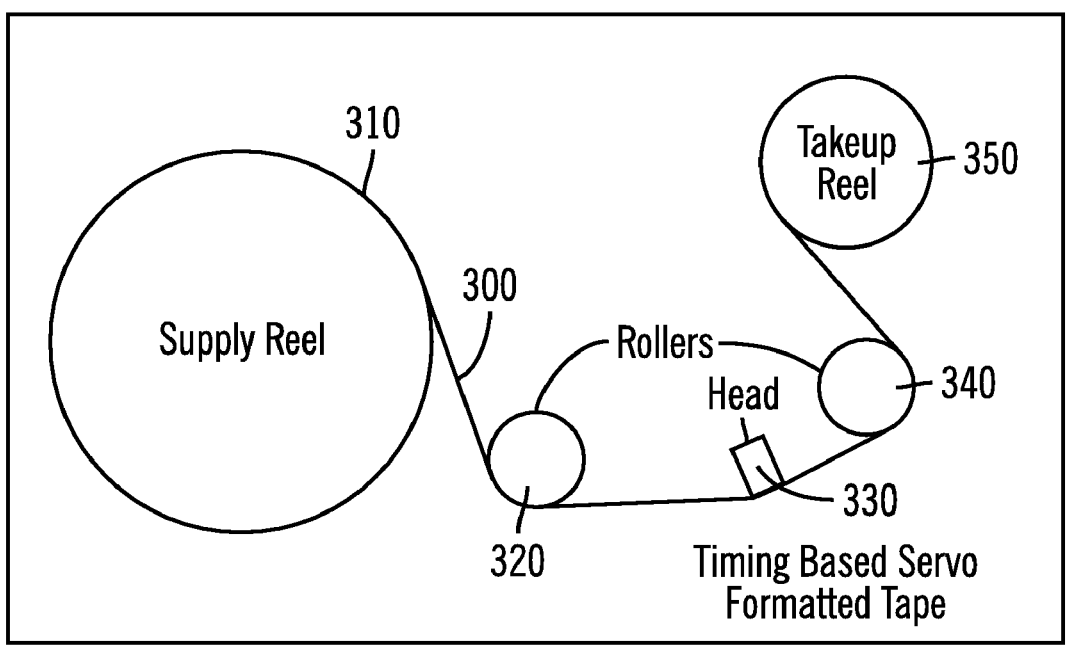
FIG. 3 illustrates a tape drive layout in accordance with certain embodiments.

FIG. 3 illustrates a tape drive layout in accordance with certain embodiments. Timing based servo formatted tape 300 is wound on a supply reel 310 and is wound by roller 320, head 330 (also referred to as "servo read head"), and roller 340 to takeup reel 350. During normal operation, the head 330 reads the servo format that is on the tape 300. Servo format may be described as magnetic transitions written on the tape. The servo format may also be described as a sub micron array that is written on the tape at the time the tape is manufactured. The head 330 is locked onto the servo format to make sure that it is reading the tape properly.

Tape drives have servo tracks written along the entire length of the tape media. The servo patterns formed by the servo tracks are used for head positioning, track following, linear tape position, and tape speed control, and are very accurate. Typically, the servo pattern consists of symbols written with precise distances between them. Counting the number of occurrences of a symbol can then be translated into a precise distance between those symbols. For example, timing based servo consists of four symbols, written A B C D A B C D . . . . The distance from symbol A to C is 100 microns. The distance from symbol C to A is 100 microns. The distance between two points on tape can be calculated from the number of A symbol to C symbol intervals (AC) and the number of C symbol to A symbol intervals (CA). Distance=(AC+CA)*100 microns.

Figure 4:
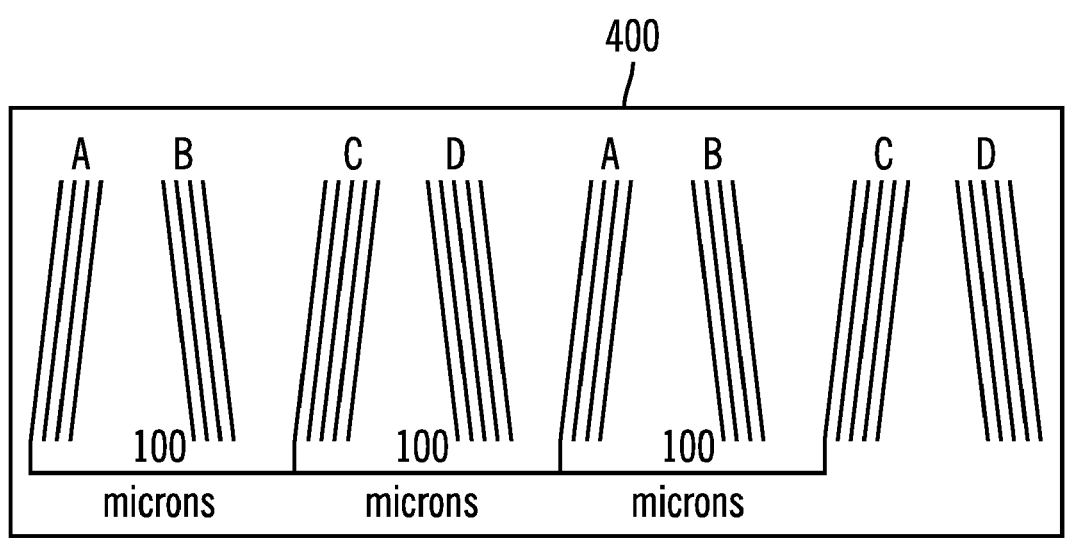
FIG. 4 illustrates a representation of a servo format on a tape in accordance with certain embodiments.

FIG. 4 illustrates a representation 400 of a servo format on a tape in accordance with certain embodiments. In FIG. 4, the "A" and "C" lines are parallel. Although the lines are "straight" lines in FIG. 4, in various embodiments, the lines may not be straight (e.g., may form chevron stripes). The distance between a first line in an "A" set of lines and a first line in a subsequent "C" set of lines is 100 microns. Also, the distance between a first line in a "C" set of lines and a first line in a subsequent "A" set of lines is 100 microns.

U.S. Pat. No. 5,689,384, issued on Nov. 18, 1997, describes a timing based servo system for magnetic tape systems and is incorporated herein by reference in it entirety. A servo format may also be described as a servo pattern. A servo format comprises magnetic flux transitions that extend across the width of a servo track such that the servo read head signal produced by reading the servo format varies continuously as the servo read head is moved across the width of each servo track.

With reference to the servo format illustrated in FIG. 4, those skilled in the art will recognize that the dark vertical bands, hereafter called stripes, represent magnetized areas of recorded magnetic flux that extend across the width of a servo track and that the edges of the stripes comprise flux transitions that are detected to generate the servo read head signal. The transitions have two magnetic polarities, one on each edge of a stripe. When the servo read head crosses a transition, it produces a pulse whose polarity is determined by the polarity of the transition. For example, the servo head might produce positive pulses on the leading edge of each stripe (on encountering a stripe) and negative pulses on the trailing edge (on leaving a stripe). Each servo format comprises a repeating sequence of different stripes having at least two orientations across the width of the track such that the first orientation is not parallel to the second orientation.

With the servo format illustrated in FIG. 4, a magnetic servo read head that is positioned above the tape as the tape is moved linearly with respect to the head in the transducing direction generates an analog servo read head signal having peaks whose peak-to-peak timing varies as the head is moved across the width of the track in the translating direction. The variation in timing is used to determine the relative position of the magnetic servo read head within the servo track.

The servo format illustrated in FIG. 4 includes stripes that define intervals that are used to generate a position signal that is independent of tape speed. The position signal is generated by timing the intervals and calculating their ratio. The timing intervals from "A" to "C" and from "C" to "A" are constant, regardless of position.

In certain embodiments, it is possible to interpolate to less than 100 microns using the individual strips within a burst. In certain embodiments, rather than using "AC" bursts, "BD" bursts or other parallel lines may be used.

Embodiments combine the information from the hall sensors and the servo format to measure the circumference of a tape pack on each reel, assuming an 8 pole motor.

Figure 5:
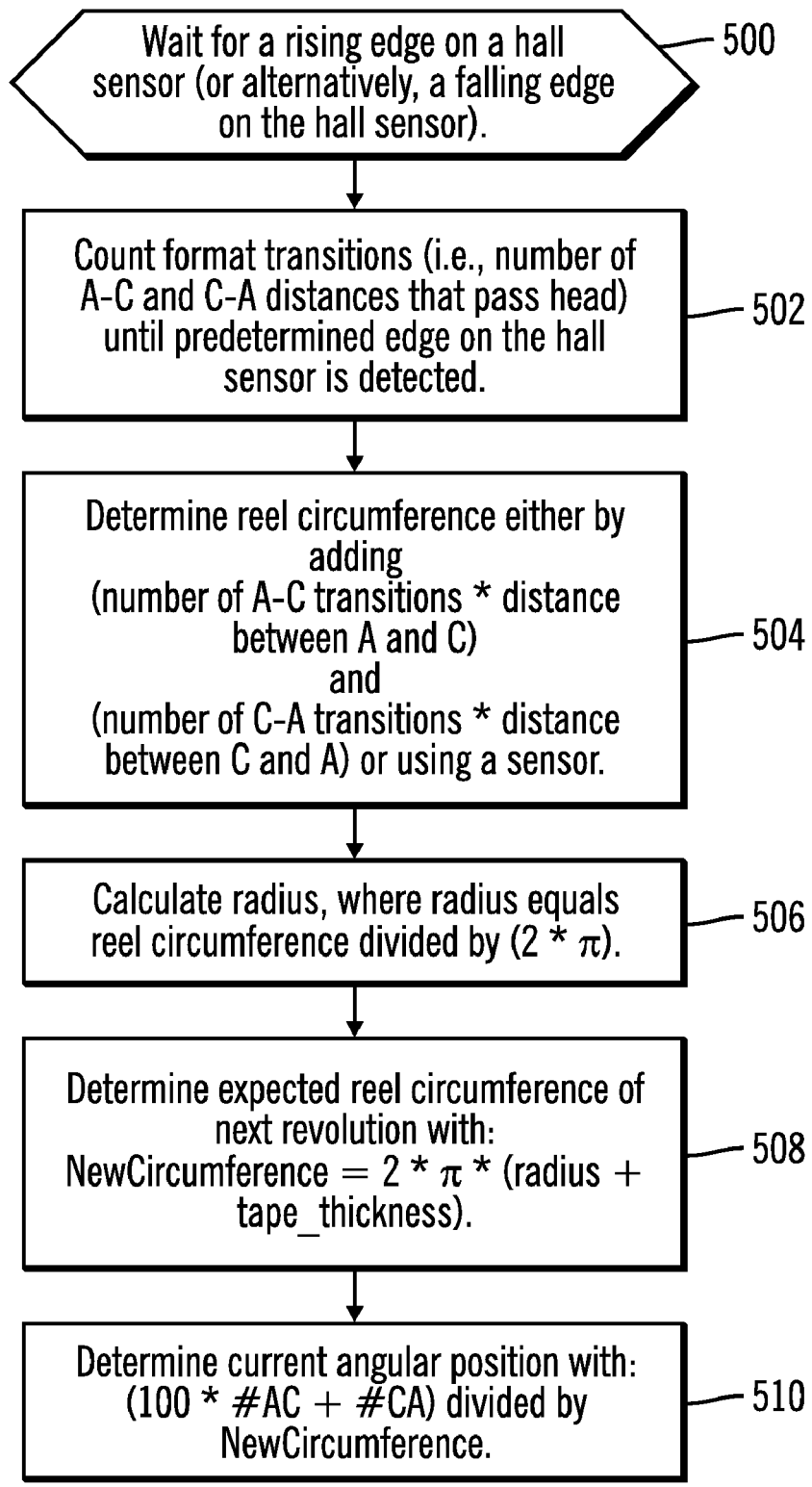
FIG. 5 illustrates logic for calculating an angular position in accordance with certain embodiments.

FIG. 5 illustrates logic for calculating an angular position in accordance with certain embodiments. Control begins at block 500 with the angular position calculator 170 waiting for a rising edge on a hall sensor. In alternative embodiments, the angular position calculator 170 waits for a falling edge on the hall sensor.

In block 502, the angular position calculator 170 counts format transitions (e.g., number of A-C transitions (#AC) and number of C-A transitions (#CA) that pass head 330) until a predetermined edge (e.g., an $8^{th}$ rising edge or an $8^{th}$ falling edge) on the hall sensor is detected.

In block 504, the angular position calculator 170 determines a reel circumference. In certain embodiments, the reel circumference is determined using Equation 1, where #AC represents a number of A-C transitions that have been counted, #CA represents a number of C-A transitions that have been counted, and 100 microns represents a distance between A and C and between C and A:

$$\text{Reel Circumference} = \#AC * 100 \text{ microns} + \#CA * 100 \text{ microns} \quad \text{Equation 1}$$

In certain embodiments, the reel circumference is determined using a sensor that detects a single revolution of a reel.

In block 506, the angular position calculator 170 calculates a radius with Equation 2:

$$\text{Radius} = \text{Reelcircumference}/(2*\pi) \quad \text{Equation 2}$$

In block 508, the angular position calculator 170 determines an expected reel circumference (i.e., "NewCircumference") of a next revolution with Equation 3

$$\text{NewCircumference} = 2*\pi*(\text{radius}+\text{tape\_thickness}) \quad \text{Equation 3}$$

In block 510, the angular position calculator 170 determines a current angular position with Equation 4:

$$\text{Angular Position} = \frac{100*(\#AC + \#CA)}{NewCircumference} \quad \text{Equation 4}$$

For example, if there have been three A-C format transitions and two C-A format transitions, then the angular position is calculated with:

$$\text{Angular Position} = \frac{100*(3+2)}{NewCircumference}$$

Thus, embodiments use a previous circumference measurement and determine a current angular position by length of tape wound since the start of a revolution.

ADDITIONAL EMBODIMENT DETAILS

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device). Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk read only memory (CD-ROM), compact disk read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIG. 5 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 5 may be implemented in software, hardware, programmable and non-programmable gate array logic or in some combination of hardware, software, or gate array logic.

Figure 6:
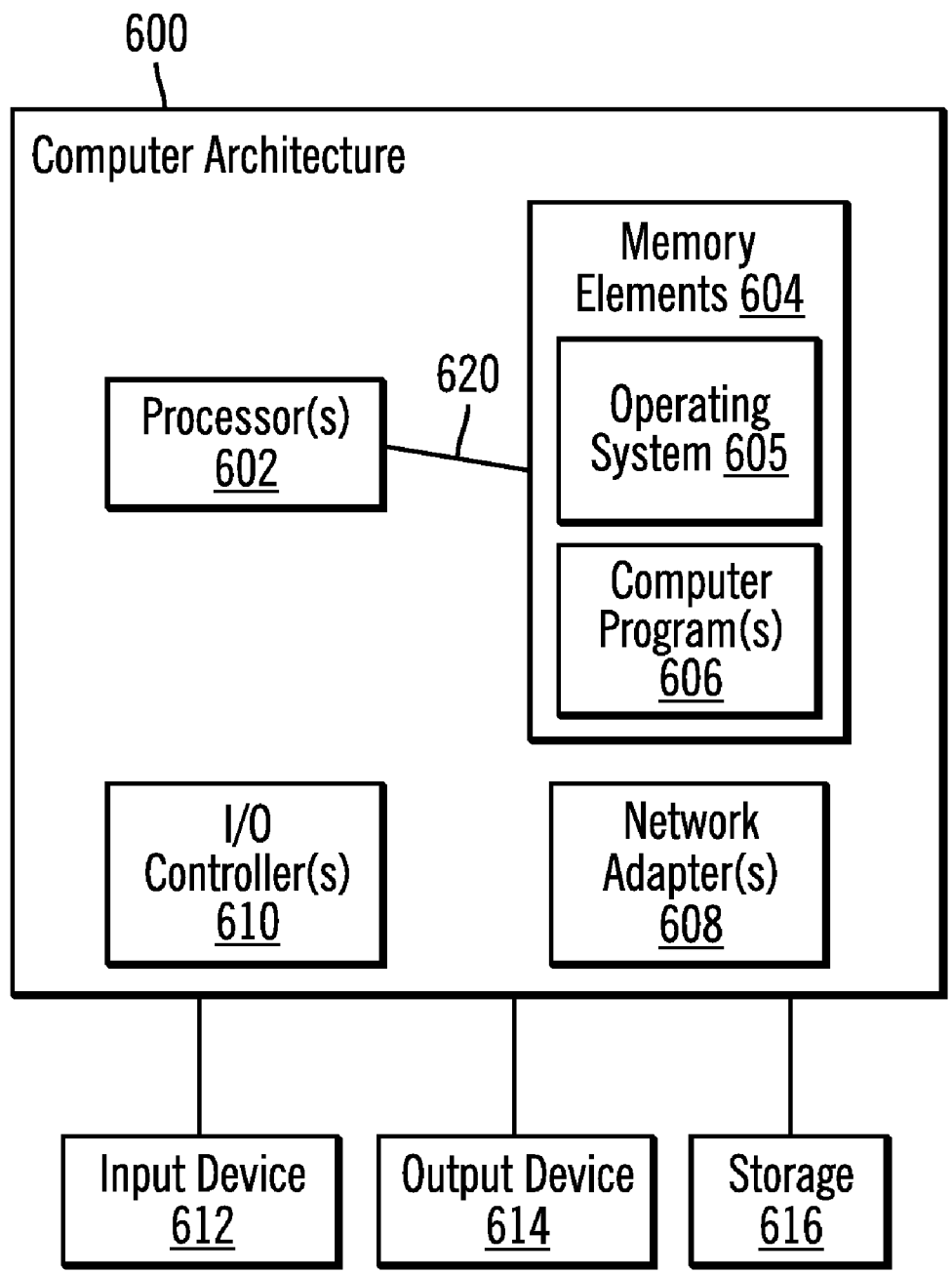
FIG. 6 illustrates a system architecture that may be used in accordance with certain embodiments.

FIG. 6 illustrates a system architecture 600 that may be used in accordance with certain embodiments. Client computer 100 and/or server computer 120 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
    identifying a first edge of a hall sensor, wherein the hall sensor changes state as poles of a motor pass by, and wherein there is an edge associated with each pole of the motor;
    counting a number of magnetic format transitions on a timing based servo formatted tape until detecting a predetermined edge of the hall sensor, wherein the predetermined edge is a number of edges after the first edge of the hall sensor, wherein a servo format is formed by the magnetic format transitions written on a tape medium;
    determining a reel circumference;
    determining a radius using the determined reel circumference;
    determining a new circumference of a next revolution using the determined radius and a tape thickness; and
    determining a current angular position using the determined new circumference and the counted magnetic format transitions, wherein the current angular position is an amount of rotation from an origin of a tape reel.

2. The method of claim 1, wherein the predetermined edge is an eighth edge.

3. The method of claim 1, wherein the reel circumference is determined using a sensor that detects a single revolution of a reel.

4. The method of claim 1, wherein a servo format of the timing based servo formatted tape has parallel lines representing magnetic format transitions and wherein counting the magnetic format transitions comprises counting using the parallel lines.

5. The method of claim 1, wherein determining the reel circumference further comprises:
    generating a first value by multiplying a first number of magnetic format transitions by a distance;
    generating a second value by multi in a second number of magnetic format transitions by the distance; and
    adding the first value and the second value.

6. The method of claim 1, wherein determining the radius further comprises:
    calculating ReelCircumference/$(2*\pi)$.

7. The method of claim 1, wherein determining the new circumference further comprises:
    calculating $2*\pi*(radius+tape\_thickness)$.

8. The method of claim 1, wherein determining the current angular position further comprises:
    determining an expected reel circumference.

9. A computer program product comprising a computer-readable storage medium storing a computer readable program, wherein the computer readable program when executed by a processor on a computer causes the computer to:
    identify a first edge of a hall sensor, wherein the hall sensor changes state as poles of a motor pass by, and wherein there is an edge associated with each pole of the motor;
    count a number of magnetic format transitions on a timing based servo formatted tape until detecting a predetermined edge of the hall sensor, wherein the predetermined edge is a number of edges after the first edge of the hall sensor, wherein a servo format is formed by the magnetic format transitions written on a tape medium;
    determine a reel circumference using the counted magnetic format transitions;
    determine a radius using the determined reel circumference;
    determine a new circumference of a next revolution using the determined radius and a tape thickness; and
    determine a current angular position using the determined new circumference and the counted magnetic format transitions, wherein the current angular position is an amount of rotation from an origin of a tape reel.

10. The computer program product of claim 9, wherein the predetermined edge is an eighth edge.

11. The computer program product of claim 9, wherein the reel circumference is determined using a sensor that detects a single revolution of a reel.

12. The computer program product of claim 9, wherein a servo format of the timing based servo formatted tape has parallel lines representing magnetic format transitions and wherein counting the magnetic format transitions comprises counting using the parallel lines.

13. The computer program product of claim 9, wherein when determining the reel circumference, the computer readable program when executed on a computer causes the computer to:
    generate a first value by multiplying a first number of magnetic format transitions by a distance;
    generate a second value by multiplying a second number of magnetic format transitions by the distance; and
    add the first value and the second value.

14. The computer program product of claim 9, wherein when determining the radius, the computer readable program when executed on a computer causes the computer to:
    calculate ReelCircumference/$(2*\pi)$.

15. The computer program product of claim 9, wherein when determining the new circumference, the computer readable program when executed on a computer causes the computer to:
    calculate $2*\pi*(radius+tape\_thickness)$.

16. The computer program product of claim 9, wherein when determining the current angular position, the computer readable program when executed on a computer causes the computer to:
    determine an expected reel circumference.

17. A system, comprising:
    a processor; and
    an integrated circuit performing operations, the operations comprising:
    identifying a first edge of a hall sensor, wherein the hall sensor changes state as poles of a motor pass by, and wherein there is an edge associated with each pole of the motor;
    counting a number of magnetic format transitions on a timing based servo formatted tape until detecting a predetermined edge of the hall sensor, wherein the predetermined edge is a number of edges after the first edge of the hall sensor, wherein a servo format is formed by the magnetic format transitions written on a tape medium;
    determining a reel circumference using the counted magnetic format transitions;
    determining a radius using the determined reel circumference;
    determining a new circumference of a next revolution using the determined radius and a tape thickness; and
    determining a current angular position using the determined new circumference and the counted magnetic format transitions, wherein the current angular position is an amount of rotation from an origin of a tape reel.

18. The system of claim 17, wherein the predetermined edge is an eighth edge.

19. The system of claim 17, wherein the reel circumference is determined using a sensor that detects a single revolution of a reel.

20. The system of claim 17, wherein a servo format of the timing based servo formatted tape has parallel lines representing magnetic format transitions and wherein counting the magnetic format transitions comprises counting using the parallel lines.

21. The system of claim 17, wherein the operations for determining the reel circumference further comprise:

generating a first value by multiplying a first number of magnetic format transitions by a distance;

generating a second value by multiplying a second number of magnetic format transitions by the distance; and adding the first value and the second value.

22. The system of claim 17, wherein the operations for determining the radius further comprise:

calculating ReelCircumference/(2*π).

23. The system of claim 17, wherein the operations for determining the new circumference further comprise:

calculating 2*π*(radius+tape_thickness).

24. The system of claim 17, wherein the operations for determining the current angular position further comprise:

determining an expected reel circumference.

* * * * *